US010825370B1

(12) United States Patent
Byagowi

(10) Patent No.: US 10,825,370 B1
(45) Date of Patent: Nov. 3, 2020

(54) SYSTEMS AND METHODS FOR UPDATING PIXEL ARRAYS

(71) Applicant: Facebook Technologies, LLC, Menlo Park, CA (US)

(72) Inventor: Ahmad Byagowi, Fremont, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/175,781

(22) Filed: Oct. 30, 2018

(51) Int. Cl.

| | |
|---|---|
| ***G09G 3/32*** | (2016.01) |
| ***G09G 3/20*** | (2006.01) |
| ***H04N 13/356*** | (2018.01) |
| ***G09G 3/00*** | (2006.01) |

(52) U.S. Cl.
CPC ............... *G09G 3/007* (2013.01); *G09G 3/32* (2013.01); *G09G 3/2003* (2013.01); *G09G 2310/04* (2013.01); *G09G 2320/0242* (2013.01); *G09G 2320/0252* (2013.01); *G09G 2320/043* (2013.01); *G09G 2340/0407* (2013.01)

(58) Field of Classification Search
CPC ...... G09G 3/007; G09G 3/32; G09G 2310/04; G09G 2320/043; G09G 2320/0252; G09G 2320/0242; G09G 2340/0407; G09G 3/2003
See application file for complete search history.

(56) References Cited

U.S. PATENT DOCUMENTS

| | | | | |
|---|---|---|---|---|
| 6,002,385 | A * | 12/1999 | Silverbrook | G09G 3/3607 345/100 |
| 6,574,032 | B1 * | 6/2003 | Roddy | B41J 2/465 359/290 |
| 2002/0063729 | A1 * | 5/2002 | Ooe | G09G 3/2029 345/694 |
| 2012/0013580 | A1 * | 1/2012 | Lin | G09G 3/344 345/204 |
| 2015/0220777 | A1 * | 8/2015 | Kauffmann | H04N 5/2621 382/103 |
| 2017/0090848 | A1 * | 3/2017 | Tomita | G09G 3/32 |
| 2017/0366714 | A1 * | 12/2017 | Ding | G02B 23/2407 |
| 2019/0049733 | A1 * | 2/2019 | Jiang | G02B 27/106 |
| 2019/0335165 | A1 * | 10/2019 | He | G09G 3/32 |

OTHER PUBLICATIONS

Freudenrich, Craig, "How OLEDs Work", retrieved on Nov. 30, 2018, 20 pages.

* cited by examiner

*Primary Examiner* — Md Saiful A Siddiqui
(74) *Attorney, Agent, or Firm* — FisherBroyles, LLP

(57) ABSTRACT

A computer-implemented method for updating pixel arrays may include (i) displaying an image on an array of pixels via a set of pixel control modules, where each pixel within the array of pixels is communicatively coupled to a different pixel control module within the set of pixel control modules, (ii) receiving an instruction to update the image displayed on the array of pixels to a new image, (iii) identifying a pixel within the array of pixels that is in a different state in the new image than in the image, and (iv) updating the pixel to the different state by transmitting a signal from the pixel control module directly to the pixel that updates the pixel independently of additional pixels. Various other methods, systems, and computer-readable media are also disclosed.

17 Claims, 10 Drawing Sheets

SYSTEMS AND METHODS FOR UPDATING PIXEL ARRAYS

BACKGROUND

Nearly every type of personal computing device has a screen of some sort composed of pixels. Desktop computers, laptops, tablets, smartphones, virtual reality headsets, and augmented reality headsets all display images and/or video to users via pixels. Displays with too few pixels (i.e., a low resolution) suffer from numerous issues, including blocky or blurry images and visual noise such as anti-aliasing. Additionally, the refresh rate of a screen, which represents the rate at which pixels can be updated, has a significant impact on the quality of images and videos displayed to the user. In some examples, videos displayed on screens with low refresh rates can appear jerky and unrealistic.

In many traditional display systems, including liquid crystal displays and light emitting diode screens, pixels are updated by scanning one row and one column at a time to find and update the relevant pixel. In some display systems, pixels may be updated by running current through the entire row and entire column occupied by the pixel, reducing the longevity of such displays due to the excess current experienced by the pixels not being updated. Updating pixels in such a way may restrict the refresh rate of such displays. Accordingly, the instant disclosure identifies and addresses a need for additional and improved systems and methods for updating pixel arrays.

SUMMARY

As will be described in greater detail below, the instant disclosure describes systems and methods for updating pixels via individual pixel control modules communicatively coupled to each pixel.

In one example, a computer-implemented method for updating pixel arrays may include (i) displaying an image on an array of pixels via a set of pixel control modules, where each pixel within the array of pixels is communicatively coupled to a different pixel control module within the set of pixel control modules, (ii) receiving an instruction to update the image displayed on the array of pixels to a new image, (iii) identifying a pixel within the array of pixels that is in a different state in the new image than in the image, and (iv) updating the pixel to the different state by transmitting a signal from the pixel control module directly to the pixel that updates the pixel independently of additional pixels.

In some examples, the computer-implemented method may further include moving the array of pixels while timing an activation of each pixel to produce an effect of an array of virtual pixels that may include a higher resolution than the array of pixels. In one embodiment, the array of pixels may include active areas that emit light and inactive areas that do not emit light and moving the array of pixels may cause the active areas to temporarily occupy positions previously occupied by the inactive areas, creating an effect of light being produced from positions alternately occupied by the active areas and the inactive areas. In some examples, moving the array of pixels while timing the activation of each pixel to produce the effect of the array of virtual pixels that has the higher resolution than the array of pixels may increase an apparent resolution of the image by a factor of at least four.

In one embodiment, the computer-implemented method may further include receiving, by the array of pixels, data describing a high-resolution image with a resolution that exceeds a resolution of the array of pixels and displaying the high-resolution image by moving the array of pixels while timing the activation of each pixel to produce the effect of the array of virtual pixels that includes the higher resolution than the array of pixels such that an apparent resolution of the moving array of pixels is at least as high as the resolution of the high-resolution image. In some examples, updating the pixel to the different state by transmitting the signal from the pixel control module directly to the pixel that updates the pixel independently of additional pixels may enable the pixel control module to update the pixel at a sufficiently fast rate for moving the array of pixels to produce the effect of the array of virtual pixels that has the higher resolution than the array of pixels.

In some examples, moving the array of pixels may include moving the array of pixels in a circular pattern. In one embodiment, each pixel within the array of pixels may include a set of light emitters that each emit a different color of light such that a potential image displayed on the array of pixels while the array of pixels is motionless would be affected by chromatic aberration and moving the array of pixels while timing the activation of each pixel enables the pixel array to produce a transition between different colors within the image such that the potential image displayed on the array of pixels while the array of pixels is in motion is not affected by chromatic aberration.

In one embodiment, the computer-implemented method may further include simultaneously updating multiple non-adjacent pixels within the array of pixels. In some examples, updating the pixel to the different state by transmitting the signal from the pixel control module directly to the pixel that updates the pixel independently of additional pixels may include updating the image at a rate exceeding ten thousand frames per second.

In some embodiments, each pixel within the array of pixels may include at least one light-emitting diode. In one embodiment, a display device of a head-mounted display may include the array of pixels and displaying the image on the array of pixels may include displaying the image on the display device of the head-mounted display. In some embodiments, the array of pixels may include a two-dimensional grid of pixels. In one embodiment, the array of pixels may include a pixel density of at least two hundred pixels per inch.

In one embodiment, a system for implementing the above-described method may include at least one physical processor and physical memory that includes computer-executable instructions that, when executed by the physical processor, cause the physical processor to (i) display an image on an array of pixels via a set of pixel control modules, where each pixel within the array of pixels is communicatively coupled to a different pixel control module within the set of pixel control modules, (ii) receive an instruction to update the image displayed on the array of pixels to a new image, (iii) identify a pixel within the array of pixels that is in a different state in the new image than in the image, and (iv) update the pixel to the different state by transmitting a signal from the pixel control module directly to the pixel that updates the pixel independently of additional pixels.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) display an image on an array of pixels via a set of pixel control modules, where each pixel within the array of pixels is communicatively coupled to a different pixel control module within the set of pixel control modules, (ii) receive an instruction to update the image displayed on the array of pixels to a new image, (iii) identify a pixel within the array of pixels that is in a different state in the new image than in the image, and (iv) update the pixel to the different state by transmitting a signal from the pixel control module directly to the pixel that updates the pixel independently of additional pixels.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
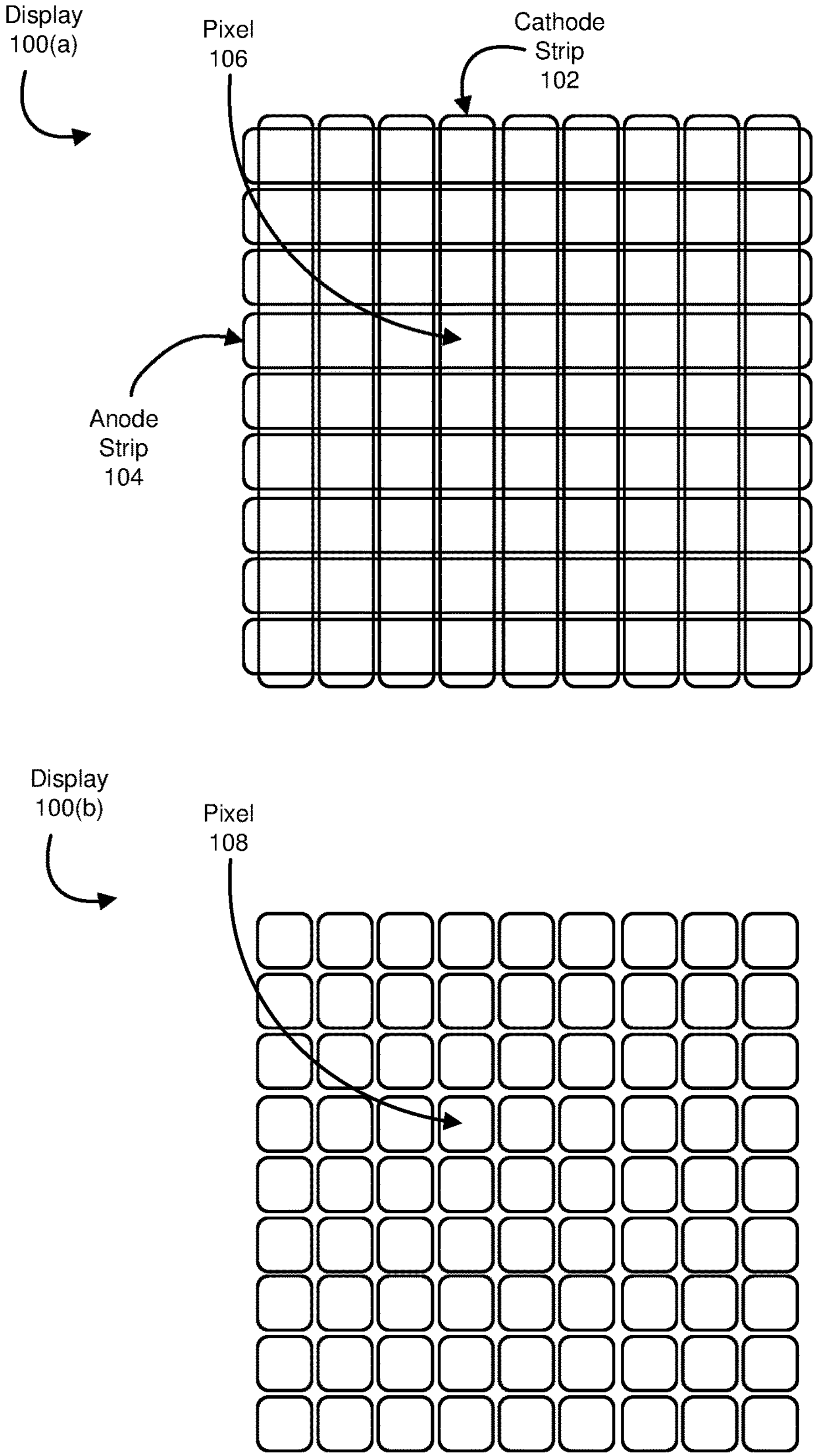
FIG. 1 is an illustration of two exemplary types of pixel arrays.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for updating pixels. As will be explained in greater detail below, embodiments of the instant disclosure may update pixels via pixel control modules that are each communicatively coupled to an individual pixel, enabling the systems described herein to update pixels without scanning through rows and/or columns. In some embodiments, directly driving each pixel may allow for significantly higher refresh rates than traditional systems while also lessening the stress on each pixel, improving longevity. In some embodiments, the high refresh rates facilitated by the systems described herein enable the creation of high-resolution displays by rapidly moving a display (e.g., in a circular or other periodic pattern) and timing the lighting of individual pixels to create the appearance of multiple virtual pixels from a single pixel (e.g., by illuminating a pixel when the active region of the pixel is positioned where an inactive region of the pixel would be found were the display in a neutral position). In some examples, precisely timed pixel illumination may also remediate other display deficiencies, such as chromatic aberration. In one embodiment, by combining the method with micro light emitting diodes (microLEDs), the systems described herein may achieve very high resolutions with high refresh rates in augmented reality headset displays. Accordingly, the systems and methods described herein may improve the fields of video and/or augmented reality by enabling improved visual displays. Additionally, the systems described herein may improve the functioning of a computing device that displays images and/or video on a screen or other display device by improving the resolution of the display device and/or reducing chromatic aberration on the display device.

FIG. 1 illustrates an example organic light emitting diode (OLED) display 100(*a*) that is composed of perpendicular layers of cathode strips and anode strips with pixels defined as the intersections between pairs of strips. In one embodiment, to update a pixel 106, display 100(*a*) may run current through cathode strip 102 and anode strip 104. This method of updating pixels may be inefficient both in terms of time and in terms of wear on components. Other types of displays, while composed of physically individual pixels, may have similar issues as the control systems for all of the pixels may be linked such that each pixel may only be accessed by scanning through rows and/or columns to find the intersection occupied by the pixel. For example, all of the pixels in the display may be connected to a single circuit. By contrast, display 100(*b*) is composed of individually controlled pixels. To update pixel 108, display 100(*b*) may update pixel 108 directly via a pixel control module that is communicatively coupled to pixel 108 and not to any additional pixels. The term "pixel," as used herein, may generally refer to any discrete area of illumination on a screen or other type of display device and/or any physical component that produces a discrete area of illumination. The term "pixel control module," as used herein, generally refers to any hardware and/or software component that is communicatively coupled to a pixel that sends signals instructing the pixel as to when and how to activate. For example, a pixel control module may include a circuit and/or memory register. In some embodiments, the systems described herein may include a multiple pixel control module that updates multiple pixels in parallel (e.g., each pixel in the display being changed for a given frame). In one embodiment, the multiple pixel control module may send signals to each individual pixel control module.

Figure 2:
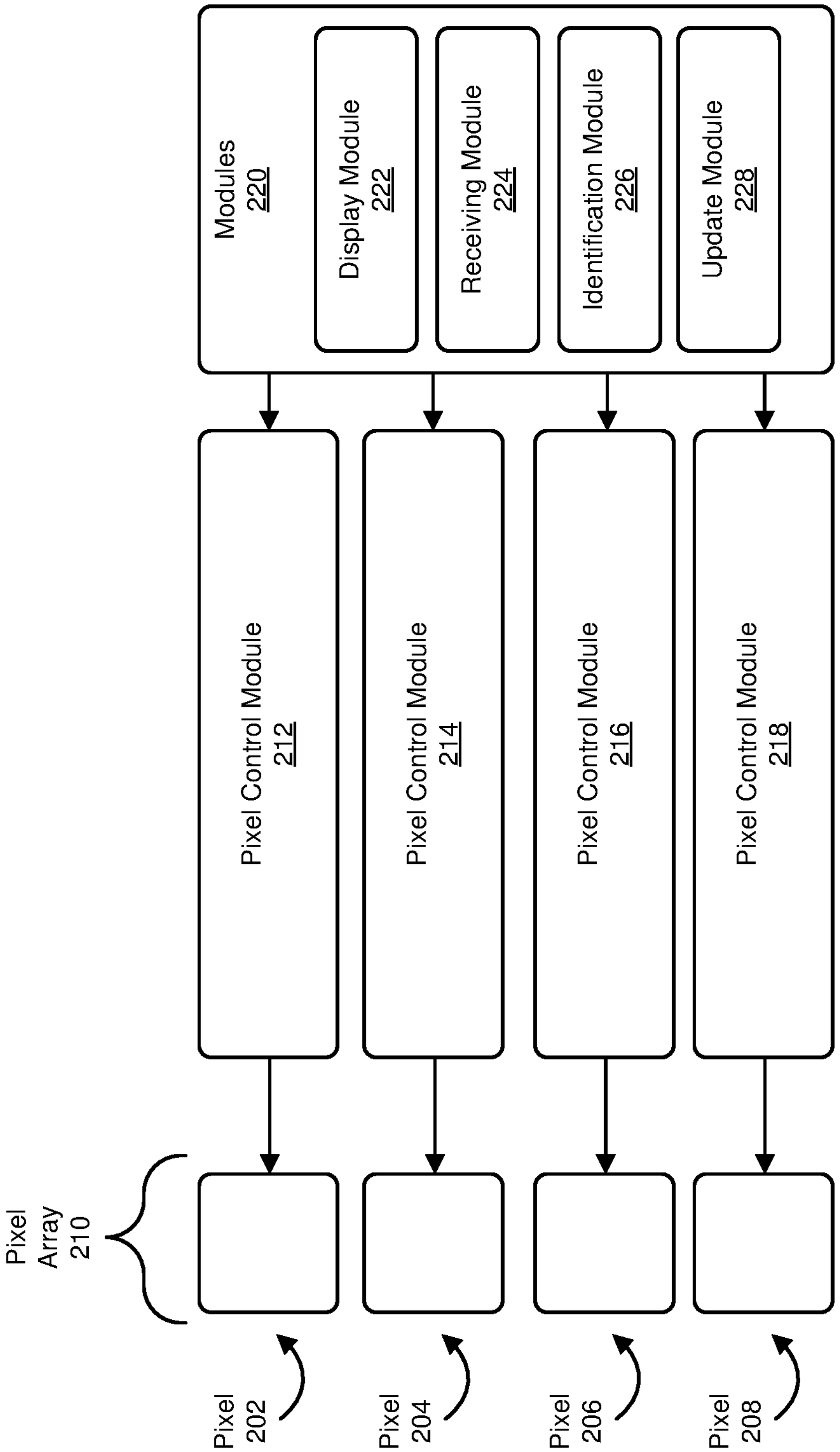
FIG. 2 is a block diagram of an exemplary system for updating pixel arrays.

FIG. 2 is an illustration of a system for updating pixel arrays. In one embodiment, a pixel array 210 may be composed of various pixels, such as pixels 202, 204, 206, and/or 208. In some embodiments, pixel array 210 may be a square or rectangular two-dimensional grid of pixels. In other embodiments, pixel array 210 may be arranged in any suitable arrangement and/or shape. In some embodiments, pixels 202, 204, 206, and/or 208 may be directly controlled by pixel control modules 212, 214, 216, and/or 218, respectively. In some embodiments, pixel control modules 212, 214, 216, and/or 218 may be directed by another module or set of modules that directs display on pixel array 210 as a whole. For example, pixel control modules 212, 214, 216, and/or 218 may be communicatively coupled to modules 220. In some embodiments, modules 220 may include a display module 222 that directs pixel array 210 to display images and/or video, a receiving module 224 that receives instructions on what images and/or video to display, an identification module 226 that identifies which pixels in pixel array 210 to update in order to display a new image and/or the next frame of a video, and/or an update module 228 that directs pixel array 210 to display the new image and/or next frame of the video.

Figure 3:
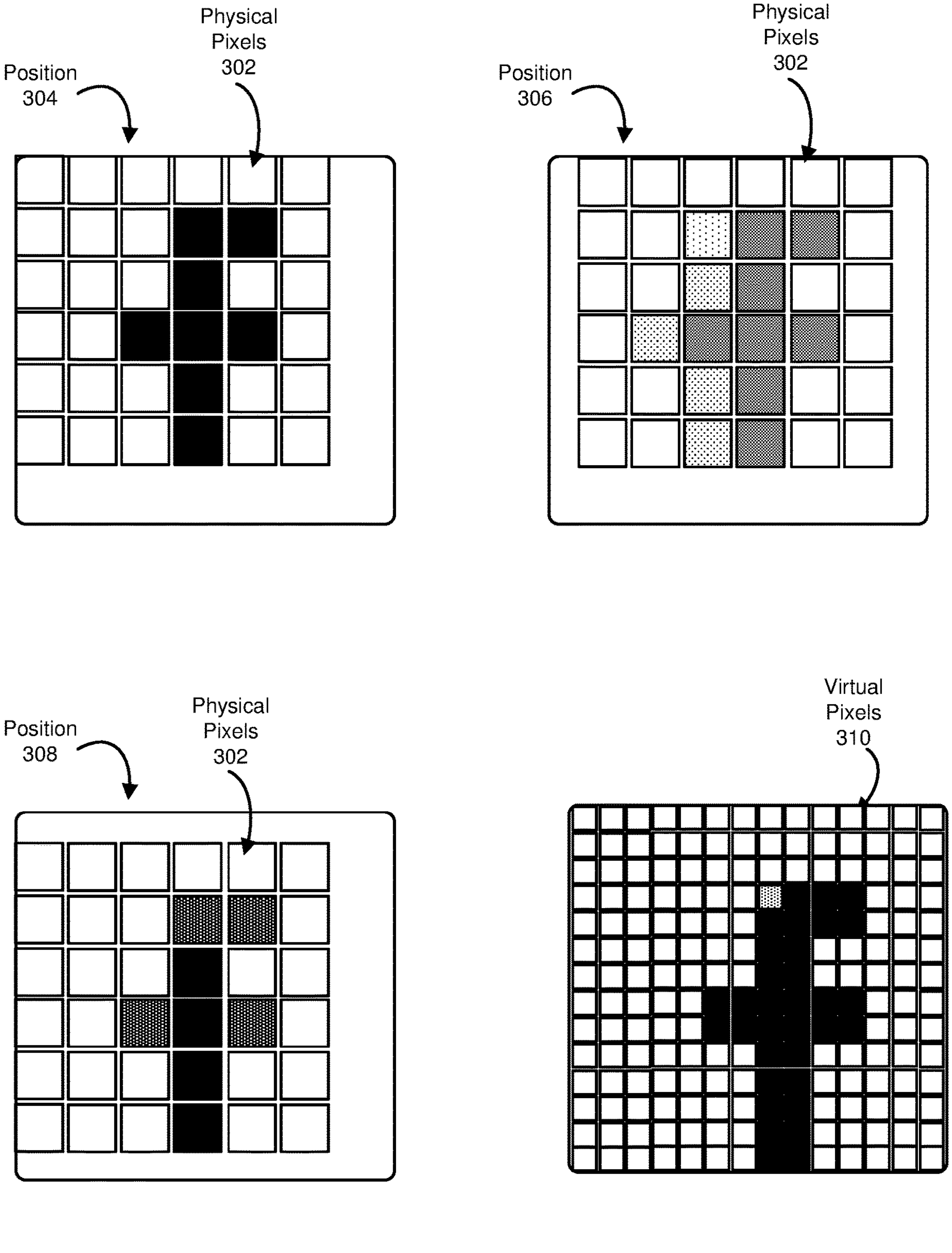
FIG. 3 is an illustration of an exemplary movement pattern of a pixel array.

In some embodiments, the systems described herein may move an array of pixels while timing an activation of each pixel to produce the effect of an array of virtual pixels with a higher resolution than the array of pixels. For example, as illustrated in FIG. 3, physical pixels 302 may start at a position 304. The systems described herein may move physical pixels 302 to a position 306, a position 308, and/or other intermediate and/or additional positions. By moving pixels 302 in this manner while also timing the activation of each pixel within pixels 302 based on the position of pixels 302, the systems described herein may create the effect of virtual pixels 310. In some examples, virtual pixels 310 may appear to have a higher resolution and/or display a more clearly defined image than is possible for pixels 302 when pixels 302 are not in motion. In some embodiments, virtual pixels 310 may have a higher resolution than pixels 302 by a factor of four. In some embodiments, virtual pixels 310 may have a higher resolution than pixels 302 by an even greater factor. In some embodiments, pixels 302 may have a pixel density of at least two hundred pixels per inch. In one embodiment, pixels 302 may have a pixel density exceeding three hundred pixels per inch, five hundred pixels per inch, and/or eight hundred pixels per inch. In one embodiment, pixels 302 may have a pixel density of at least seven pixels per degree when part of a display that occupies at least a ninety-degree field of view horizontally. In some embodiments, pixels 302 may have a pixel density of at least ten, twenty, thirty, or more pixels per degree when part of a display that occupies a ninety-degree field of view horizontally. Additionally or alternatively, pixels 302 may occupy a display with a different field of view such as forty-five, sixty, or one hundred degrees, and may have an adjusted pixel per degree density accordingly.

Figure 4:
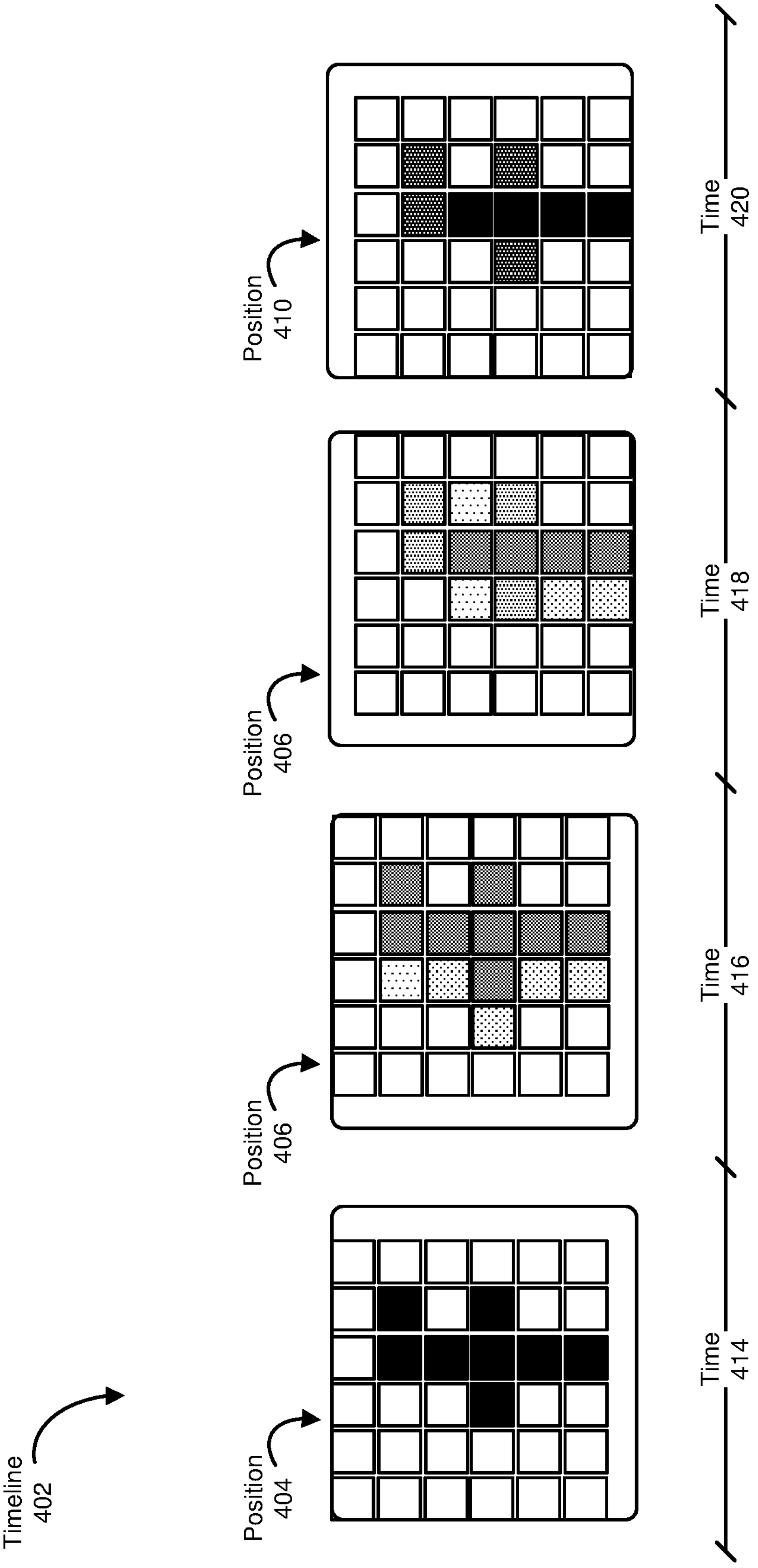
FIG. 4 is a timeline of an exemplary moving pixel array.

In some embodiments, the systems described herein may activate different pixels and/or cause pixels to display different colors based on the position of a moving array of pixels. For example, as illustrated in FIG. 4, at time 514 an array of pixels may occupy a position 504 and be activated according to a certain pattern. At time 516, the array of pixels may occupy a position 506 and may be activated in a different pattern. Similarly, at time 518 the array of pixels may occupy a position 508 while at time 520 the array of pixels may occupy a position 510, with the activation pattern of the array of pixels changing at each segment of the timeline in synchronization with the change of position. In one embodiment, the systems described herein may move the array of pixels in a circular pattern and update the pixels every ninety degrees of motion. In some examples, the systems described herein may be capable of moving the array of pixels in different types of patterns and/or at different rates in order to achieve different effects. For example, the systems described herein may move the array of pixels at a faster rate to achieve a higher apparent resolution and/or at a slower rate to reduce resource consumption. In some embodiments, the systems described herein may move the array of pixels at some times but not at other times. For example, the systems described herein may cease moving the array (or reduce the speed at which and/or change the pattern according to which the array is moved) of pixels if the image and/or video to be displayed is of a sufficiently low resolution to be displayed on the unmoving array of pixels and/or may begin moving the array of pixels if the image and/or video to be displayed is of a higher resolution than the physical array of pixels.

Figure 5:
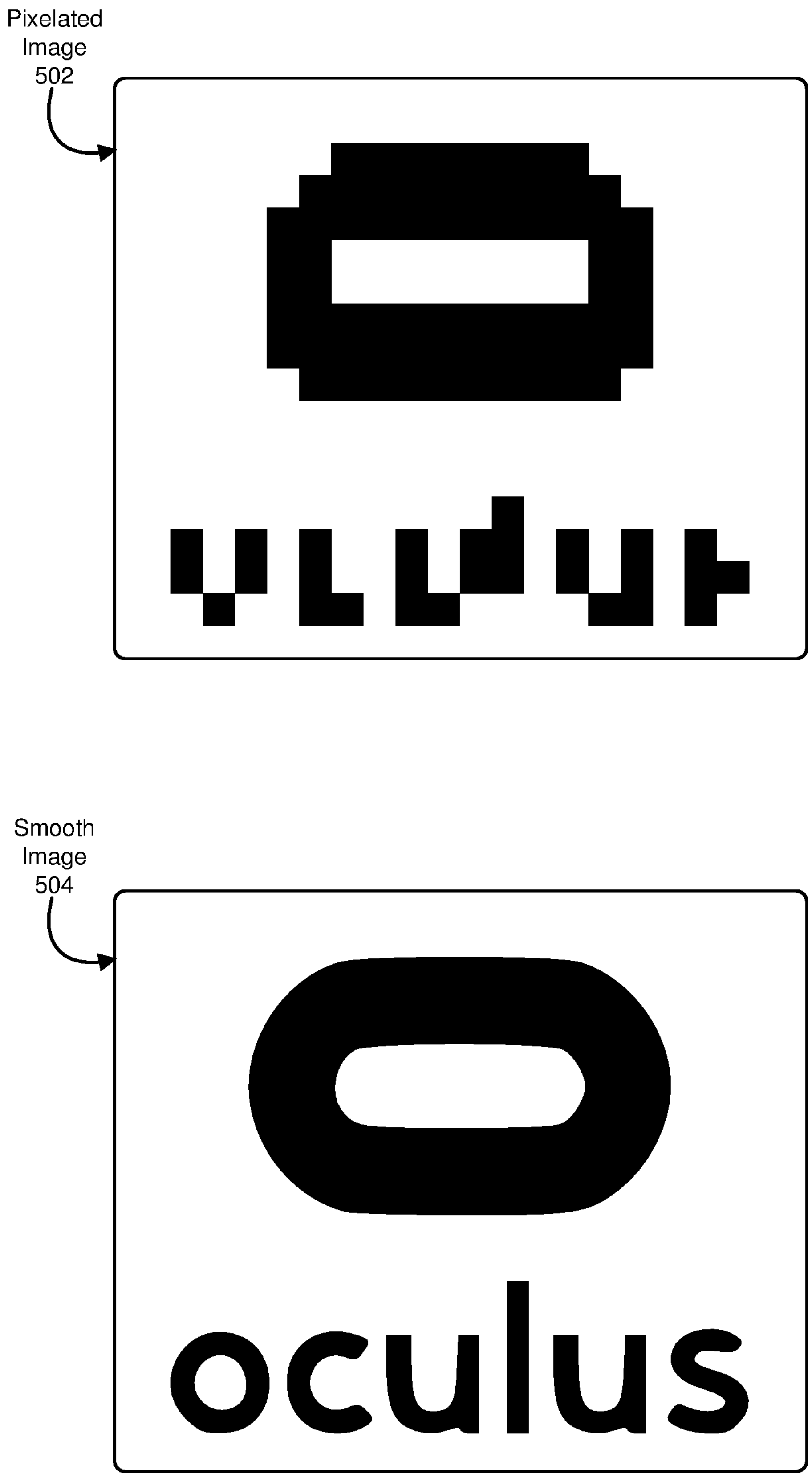
FIG. 5 is an illustration of an exemplary image in smooth and pixelated versions.

In some embodiments, the systems described herein may greatly improve the apparent resolution of an image and/or display an image of a higher resolution than otherwise feasible by moving the array of pixels. For example, as illustrated in FIG. 5, a pixelated image 502 may appear on a screen when an array of pixels that constitutes the screen is motionless. However, when the array of pixels is moved while being updated at the correct rate, a smooth image 504 may appear on the screen. In some embodiments, smooth image 504 may be of a higher resolution (i.e., greater number of pixels) than the screen of physical pixels and may degrade to pixelated image 502 when displayed on a motionless screen of physical pixels. In some embodiments, faster movement may cause the effect of higher resolution. In some embodiments, creating the effect of increased resolution may require the array of pixels to be updated at very high speeds in order to effectively synchronize the pixel activation with the movement. In these embodiments, directly driving pixels via individual pixel control modules may enable the systems described herein to update pixels at a sufficient speed to synchronize with the movement of the array of pixels. In one example, the systems described herein may update pixels at speeds exceeding ten thousand frames per second.

Figure 6:
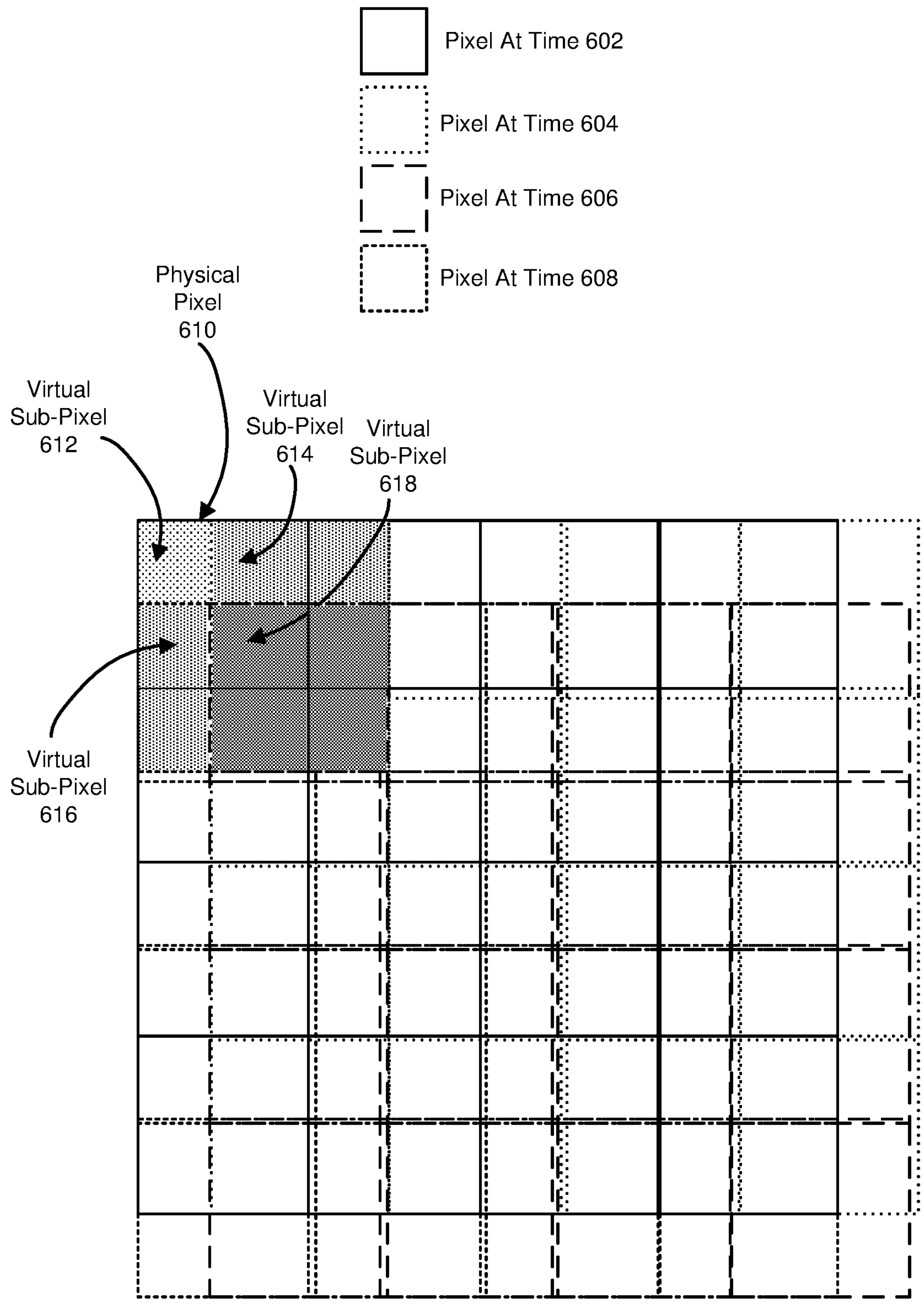
FIG. 6 is an illustration of an exemplary set of virtual sub-pixels within an array of physical pixels.

In some embodiments, moving the array of pixels while timing the activation of each pixel may create an effect of virtual sub-pixels that are smaller and more numerous than the physical pixels within the array of pixels. For example, as illustrated in FIG. 6, virtual sub-pixels 612, 614, 616, and/or 618 may appear as a result of a physical pixel 610 occupying different positions and being activated in different fashions at times 602, 604, 606, and/or 608. In this example, virtual sub-pixel 612 may display the color displayed by physical pixel 610 at time 602, virtual sub-pixel 614 may display a combination of the colors displayed at times 602 and 604, virtual sub-pixel 616 may display a combination of the colors displayed at times 602 and 608, and virtual sub-pixel 618 may display a combination of the colors displayed at times 602, 604, 606, and 608. By creating the effect of smaller virtual sub-pixels, the systems described herein may improve the apparent resolution of images and/or reduce chromatic aberrations and/or visual distortions such as anti-aliasing and/or refractive errors. For example, physical pixel 610 may display a blue color at time 602, and blue-green color at times 604 and 608, and a green color at time 606. In this example, sub-pixel 612 may be solidly blue, sub-pixels 614 and 616 may be blue-blue-green, and sub-pixel 618 may be blue-green, creating a much smoother transition of color than would be possible with a motionless physical pixel 610 displaying a single color. In some examples, the systems described herein may increase the apparent color resolution of an array of pixels by flashing different colors in the same location to create the appearance of a blended color in that location even if the blended color is not one that could be emitted directly by the physical array of pixels.

In one embodiment, the array of pixels may be positioned behind a lens, and refraction through the lens may cause chromatic aberrations. In some embodiments, the systems described herein may correct for chromatic aberrations caused by refraction by emitting different colors from pixels at slightly different positions to compensate for the effect of the lens. In some examples, the systems described herein may both correct for chromatic aberration and increase the apparent resolution of the array of pixels.

Figure 7:
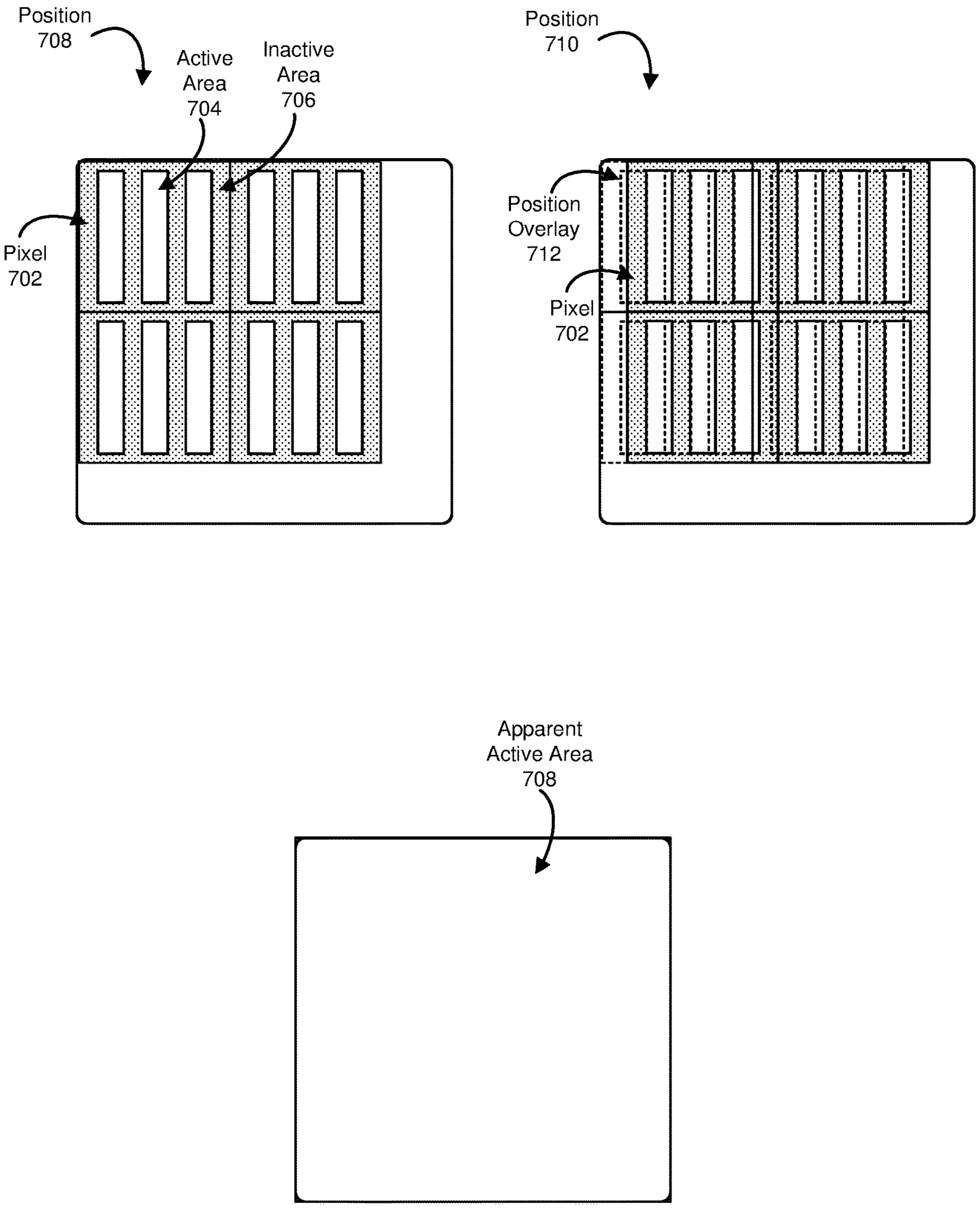
FIG. 7 is an illustration of active and inactive areas within an exemplary set of pixels.

In some embodiments, a physical pixel may be composed of both active areas that emit light and inactive areas that do not emit light. In some examples, an area may sometimes be active and other times be inactive. For example, if a pixel includes a diode that emits red light, a diode that emits blue light, and a diode that emits green light, the diode that emits green light may be an active area when the pixel is white and an inactive area when the pixel is violet. In one example, as illustrated in FIG. 7, a pixel 702 may have one or more active areas 704 as well as an inactive area 706. If pixel 702 is at rest at a position 708, it may be obvious on close inspection that light is being emitted from active area 704 but not inactive area 706. However, if pixel 702 and the surrounding array of pixels are moved rapidly, apparent active area 708 may cover a much more solid area than the actual active area at any one time. In some examples, this may be because active areas are moved through positions occupied by inactive areas. For example, at a position 710, pixel 702 may be offset from position 708 (demonstrated by position overlay 712) such that active area 704 now occupies a position previously occupied by a portion of inactive area 706.

Figure 8:
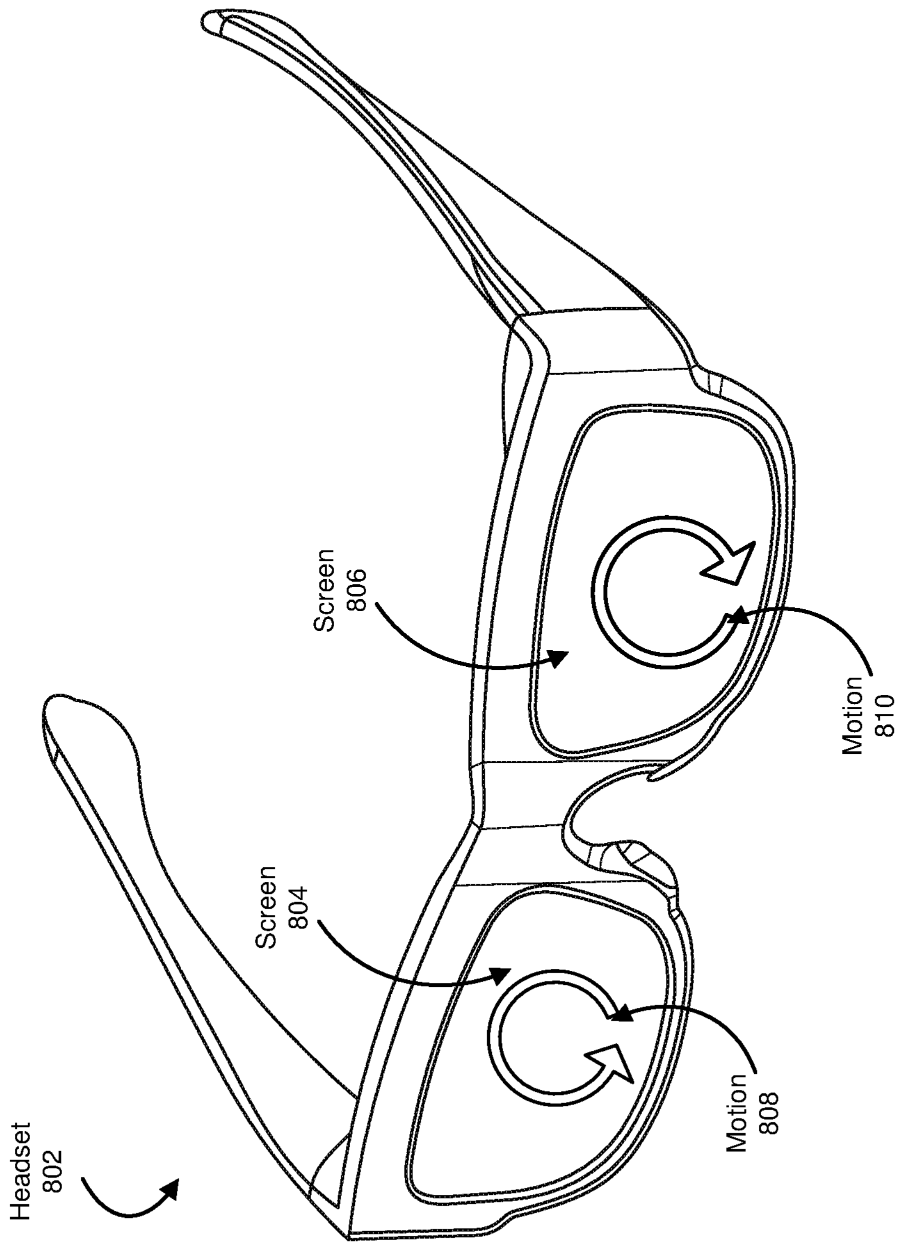
FIG. 8 is an illustration of an exemplary augmented reality headset.

In some embodiments, the array of pixels may be part of a display device of a head-mounted display and displaying the image on the array of pixels may include displaying the image on the display device of the head-mounted display. For example, the array of pixels may be part of the screen of a virtual reality headset and/or an augmented reality headset. In some examples, as illustrated in FIG. 8, two arrays of pixels may be part of the lenses of a headset 802. In some embodiments, if the systems described herein move the array of pixels in a circular pattern, the systems described herein may move the screens in each lens in opposite directions in order to minimize the feeling of motion experienced by a wearer of the headset. For example, the systems described herein may move screen 804 with motion 808 and/or screen 806 with opposing motion 810. In some embodiments, screen 804 and/or screen 806 may be illuminated directionally based on motion tracking of the viewer's eyes, eliminating the need for a separate lens in front of screen 804 and/or screen 806.

Figure 9:
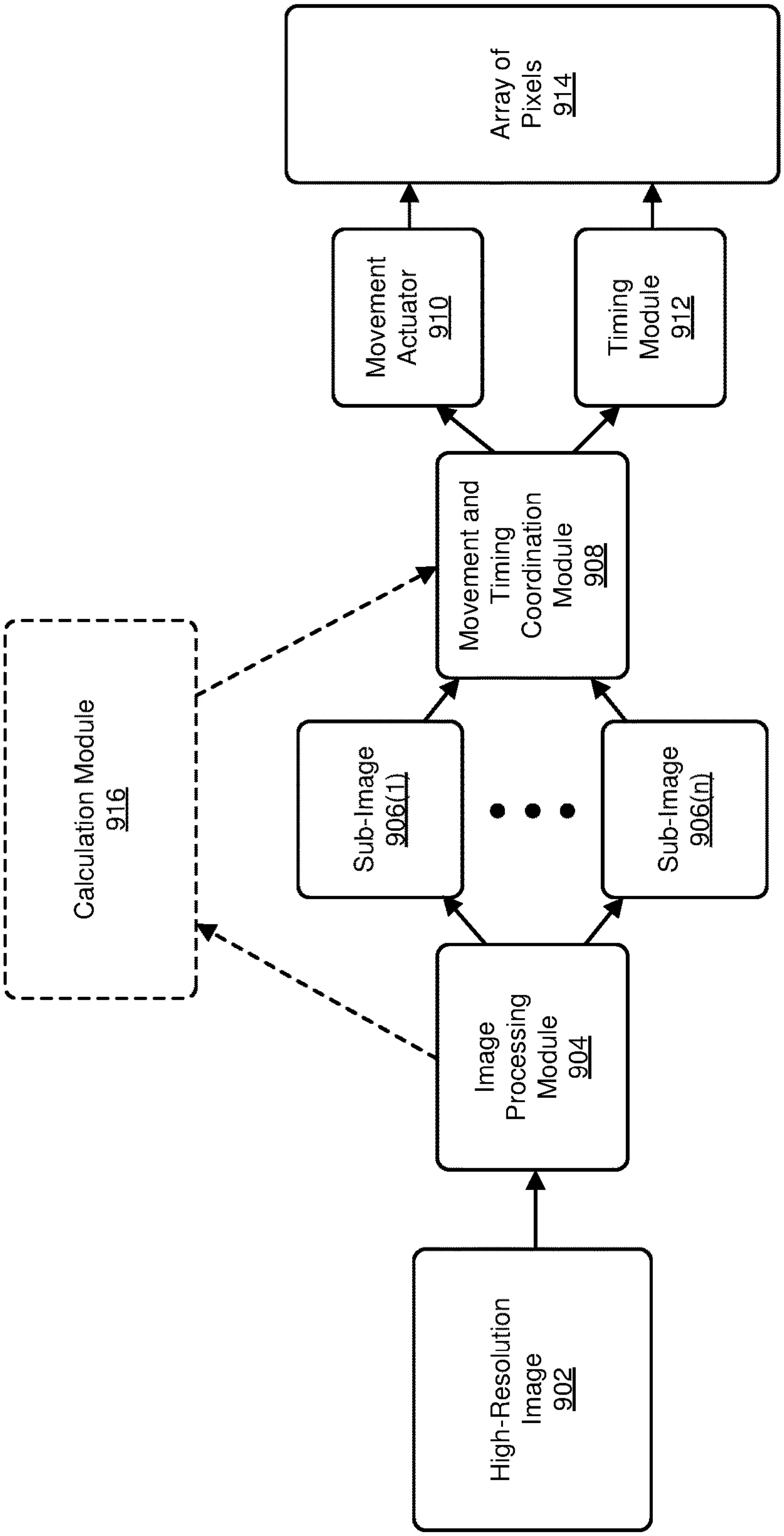
FIG. 9 is a block diagram of an exemplary system for updating pixel arrays.

In some embodiments, the systems described herein may divide an image into multiple sub-images to be displayed at different times and/or positions on a pixel array. For example, as illustrated in FIG. 9, a high-resolution image 902 may have a higher resolution than an array of pixels 914. In this example, an image processing module 904 may divide high-resolution image 902 into sub-images 906(1) through **906(*n*), with each sub-image corresponding to a set of instructions to pixel array 914 to be displayed at a particular time and/or location (e.g., as illustrated in FIG. 3 and FIG. 4). A movement and timing coordination module 908 may send instructions to a movement actuator 910 and/or a timing module 912 that synchronize the activation of specific pixels to display sub-images 906(1) through 906(*n*) with the movement of array of pixels 914 to produce the effect of displaying high-resolution image 902 on array of pixels 914. In some embodiments, the movement and/or timing of array of pixels 914 by movement actuator 910 and/or timing module 912 may be hard-coded and/or otherwise fixed. In other embodiments, a calculation module 916 may determine a pattern of movement and/or timing that enables array of pixels 914 to display high-resolution image 902. In one embodiment, calculation module 916 may select from a preset list of movement and/or timing patterns. In another embodiment, calculation module 916** may calculate movement and/or timing patterns on the fly.

Figure 10:
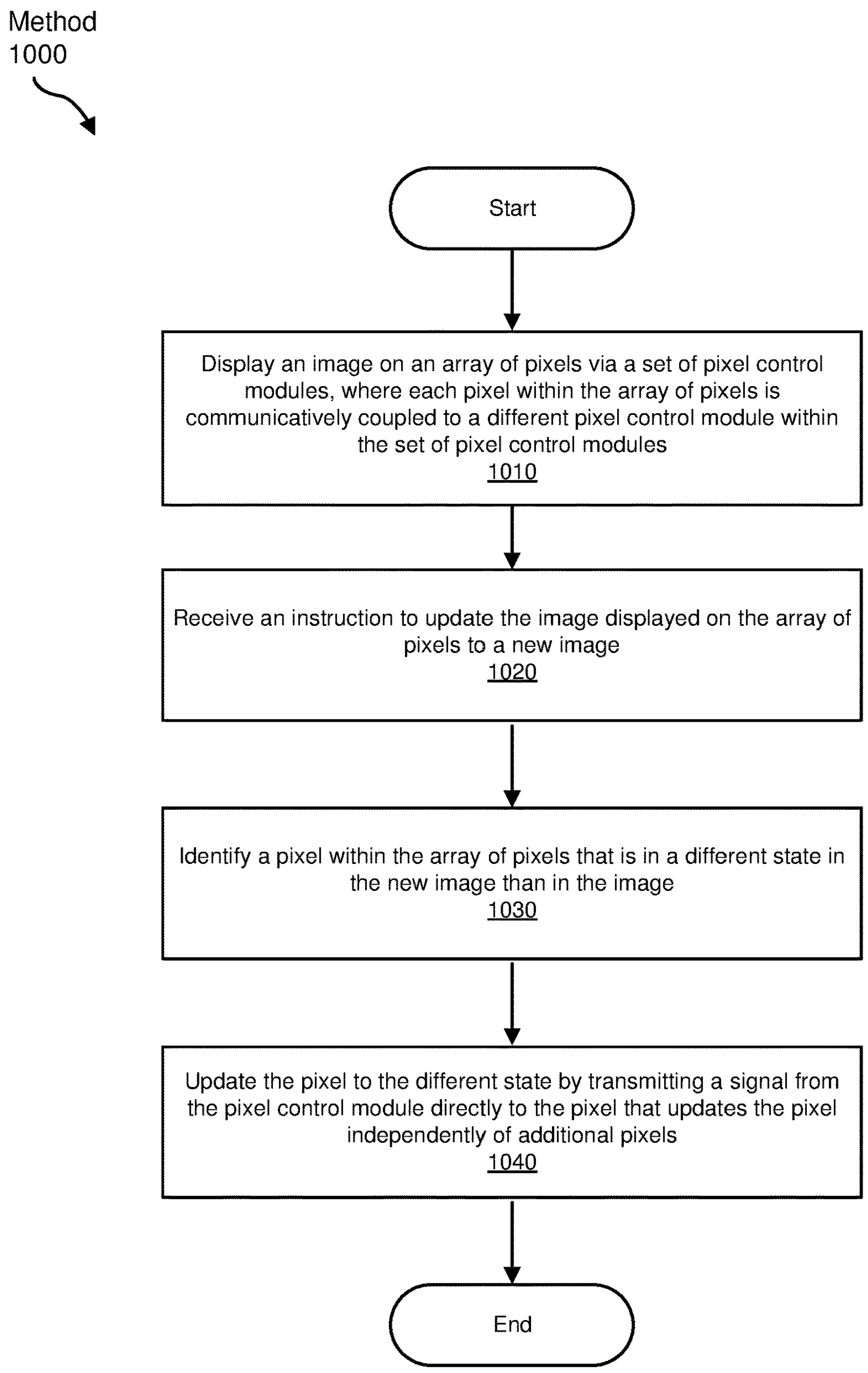
FIG. 10 is a flow diagram of an exemplary method for updating pixel arrays.

In some embodiments, the systems described herein may display images and/or video on an array of pixels via a series of steps. FIG. 10 is a flow diagram of an exemplary computer-implemented method 1000 for updating pixel arrays. The steps shown in FIG. 10 may be performed by any suitable computer-executable code and/or computing system, including the system illustrated in FIG. 2. In one example, each of the steps shown in FIG. 10 may represent an algorithm whose structure includes and/or is represented by multiple sub-steps, examples of which will be provided in greater detail below.

As illustrated in FIG. 10, at step 1010, one or more of the systems described herein may display an image on an array of pixels via a set of pixel control modules, where each pixel within the array of pixels is communicatively coupled to a different pixel control module within the set of pixel control modules. For example, each pixel may be connected to an individual circuit. In one embodiment, each pixel may access an individual register of memory to determine how to activate (e.g., what color and/or intensity of light to emit).

At step 1020, one or more of the systems described herein may receive an instruction to update the image displayed on the array of pixels to a new image. For example, the systems described herein may receive the next frame of video to be displayed.

At step 1030, one or more of the systems described herein may identify a pixel within the array of pixels that is in a different state in the new image than in the image. For example, if the video shows a red ball rolling across a lawn, a pixel that was red in the previous frame may be green while a pixel that was green in the previous frame may be red. In some examples, not all pixels within the array of pixels may be in a different state in the new image. For example, large portions of the lawn may be unchanged between frames.

At step 1040, one or more of the systems described herein may update the pixel to the different state by transmitting a signal from the pixel control module directly to the pixel that updates the pixel independently of additional pixels. In some examples, the systems described herein may simultaneously update multiple independent pixels without updating the adjacent pixels. For example, if the new image differs only in the placement of a ball on the lawn, the systems described herein may simultaneously update all of the pixels at the previous and current position of the ball but might not update the pixels surrounding those positions.

As described above, the systems and methods herein may update an array of pixels via individual pixel control modules, bypassing the need to scan rows and columns of pixels. By updating pixels in this fashion, the systems described herein may update pixels at a very high rate of speed, such as ten thousand frames per second. Updating pixels at a high rate of speed may enable the systems described herein to update moving pixel displays, synchronizing the motion of the display and the activation of pixels to produce an effect of a high-resolution display relatively free of chromatic aberration. By creating high resolution displays on comparatively small screens, the systems described herein may enable augmented reality headsets to display much more attractive and realistic images and video, enhancing the augmented reality experience.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive image data to be transformed, transform the image data into instructions to an array of pixels, output a result of the transformation to display the image on the array of pixels, use the result of the transformation to display an image and/or video, and store the result of the transformation to create a record of displayed image and/or video. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:

displaying an image on an array of pixels via a set of pixel control modules, wherein each pixel within the array of pixels is communicatively coupled to a different pixel control module within the set of pixel control modules and each pixel within the array of pixels comprises a set of light emitters that each emit a different color of light such that a potential image displayed on the array of pixels while the array of pixels is motionless would be affected by chromatic aberration;

receiving an instruction to update the image displayed on the array of pixels to a new image;

identifying a pixel within the array of pixels that is in a different activation state in the new image than in the image;

updating the pixel to the different activation state by transmitting a signal from the pixel control module directly to the pixel such that the signal updates the pixel independently of other pixels in the array of pixels; and moving the array of pixels while timing the activation of each pixel to produce an effect of an array of virtual pixels that comprises a higher resolution than the array of pixels and enable the pixel array to produce a transition between different colors within the image such that the potential image displayed on the array of pixels while the array of pixels is in motion is not affected by chromatic aberration.

2. The computer-implemented method of claim 1, wherein:

the array of pixels comprises active areas that emit light and inactive areas that do not emit light; and moving the array of pixels causes the active areas to temporarily occupy positions previously occupied by the inactive areas, creating an effect of light being produced from positions alternately occupied by the active areas and the inactive areas.

3. The computer-implemented method of claim 1, wherein moving the array of pixels while timing the activation of each pixel to produce the effect of the array of virtual pixels that comprises the higher resolution than the array of pixels increases an apparent resolution of the image by a factor of at least four.

4. The computer-implemented method of claim 1, further comprising:

receiving, by the array of pixels, data describing a high-resolution image with a resolution that exceeds a resolution of the array of pixels; and displaying the high-resolution image by moving the array of pixels while timing the activation of each pixel to produce the effect of the array of virtual pixels that comprises the higher resolution than the array of pixels such that an apparent resolution of the moving array of pixels is at least as high as the resolution of the high-resolution image.

5. The computer-implemented method of claim 1, wherein updating the pixel to the different activation state by transmitting the signal from the pixel control module directly to the pixel that updates the pixel independently of other pixels enables the pixel control module to update the pixel at a sufficiently fast rate for moving the array of pixels to produce the effect of the array of virtual pixels that comprises the higher resolution than the array of pixels.

6. The computer-implemented method of claim 1, wherein moving the array of pixels comprises moving the array of pixels in a circular pattern.

7. The computer-implemented method of claim 1, further comprising simultaneously updating multiple non-adjacent pixels within the array of pixels.

8. The computer-implemented method of claim 1, wherein updating the pixel to the different activation state by transmitting the signal from the pixel control module directly to the pixel that updates the pixel independently of other pixels comprises updating the image at a rate exceeding ten thousand frames per second.

9. The computer-implemented method of claim 1, wherein each pixel within the array of pixels comprises at least one light-emitting diode.

10. The computer-implemented method of claim 1, wherein:

a display device of a head-mounted display comprises the array of pixels; and displaying the image on the array of pixels comprises displaying the image on the display device of the head-mounted display.

11. The computer-implemented method of claim 1, wherein the array of pixels comprises a two-dimensional grid of pixels.

12. The computer-implemented method of claim 1, wherein the array of pixels comprises a pixel density of at least two hundred pixels per inch.

13. A system comprising:

at least one physical processor;

physical memory comprising computer-executable instructions that, when executed by the physical processor, cause the physical processor to:

display an image on an array of pixels via a set of pixel control modules, wherein each pixel within the array of pixels is communicatively coupled to a different pixel control module within the set of pixel control modules and each pixel within the array of pixels comprises a set of light emitters that each emit a different color of light such that a potential image displayed on the array of pixels while the array of pixels is motionless would be affected by chromatic aberration;

receive an instruction to update the image displayed on the array of pixels to a new image;

identify a pixel within the array of pixels that is in a different activation state in the new image than in the image;

update the pixel to the different activation state by transmitting a signal from the pixel control module directly to the pixel such that the signal updates the pixel independently of other pixels in the array of pixels; and moving the array of pixels while timing the activation of each pixel to produce an effect of an array of virtual pixels that comprises a higher resolution than the array of pixels and enable the pixel array to produce a transition between different colors within the image such that the potential image displayed on the array of pixels while the array of pixels is in motion is not affected by chromatic aberration.

14. The system of claim 13, wherein:

the array of pixels comprises active areas that emit light and inactive areas that do not emit light; and moving the array of pixels causes the active areas to temporarily occupy positions previously occupied by the inactive areas, creating an effect of light being produced from positions alternately occupied by the active areas and the inactive areas.

15. The system of claim 13, wherein the computer-executable instructions, when executed by the physical processor, cause the physical processor to move the array of pixels while timing the activation of each pixel to produce the effect of the array of virtual pixels that comprises the higher resolution than the array of pixels increases an apparent resolution of the image by a factor of at least four.

16. The system of claim 13, wherein the computer-executable instructions, when executed by the physical processor, cause the physical processor to:

receive, by the array of pixels, data describing a high-resolution image with a resolution that exceeds a resolution of the array of pixels; and display the high-resolution image by moving the array of pixels while timing the activation of each pixel to produce the effect of the array of virtual pixels that comprises the higher resolution than the array of pixels such that an apparent resolution of the moving array of pixels is at least as high as the resolution of the high-resolution image.

17. A non-transitory computer-readable medium comprising one or more computer-readable instructions that, when executed by at least one processor of a computing device, cause the computing device to:

display an image on an array of pixels via a set of pixel control modules, wherein each pixel within the array of pixels is communicatively coupled to a different pixel control module within the set of pixel control modules and each pixel within the array of pixels comprises a set of light emitters that each emit a different color of light such that a potential image displayed on the array of pixels while the array of pixels is motionless would be affected by chromatic aberration;

receive an instruction to update the image displayed on the array of pixels to a new image;

identify a pixel within the array of pixels that is in a different activation state in the new image than in the image;

update the pixel to the different activation state by transmitting a signal from the pixel control module directly to the pixel such that the signal updates the pixel independently of other pixels in the array of pixels; and moving the array of pixels while timing the activation of each pixel to produce an effect of an array of virtual pixels that comprises a higher resolution than the array of pixels and enable the pixel array to produce a transition between different colors within the image such that the potential image displayed on the array of pixels while the array of pixels is in motion is not affected by chromatic aberration.

* * * * *